United States Patent
Patole et al.

(10) Patent No.: US 12,257,554 B2
(45) Date of Patent: Mar. 25, 2025

(54) CONTROLLED NANOSCALE-PERFORATED TWO DIMENSIONAL MATERIALS AND MEMBRANES

(71) Applicant: Khalifa University of Science and Technology, Abu Dhabi (AE)

(72) Inventors: Shashikant P. Patole, Abu Dhabi (AE); Issam Qattan, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 596 days.

(21) Appl. No.: 17/600,055

(22) PCT Filed: Mar. 24, 2020

(86) PCT No.: PCT/IB2020/052760
§ 371 (c)(1),
(2) Date: Sep. 29, 2021

(87) PCT Pub. No.: WO2020/201914
PCT Pub. Date: Oct. 8, 2020

(65) Prior Publication Data
US 2022/0184559 A1   Jun. 16, 2022

Related U.S. Application Data

(60) Provisional application No. 62/826,729, filed on Mar. 29, 2019.

(51) Int. Cl.
*B01D 67/00* (2006.01)
*B01D 69/10* (2006.01)
(Continued)

(52) U.S. Cl.
CPC ......... *B01D 67/006* (2013.01); *B01D 69/108* (2022.08); *B01D 71/0211* (2022.08); *C02F 1/441* (2013.01); *C02F 2103/08* (2013.01)

(58) Field of Classification Search
None
See application file for complete search history.

(56) References Cited

U.S. PATENT DOCUMENTS

2013/0180912 A1*  7/2013  Li ............... B01D 71/0211
                                                    428/221
2017/0014778 A1*  1/2017  Park ............. B01D 71/021
(Continued)

FOREIGN PATENT DOCUMENTS

EP         1338329       8/2003
KR    20120081935 A      7/2012
(Continued)

OTHER PUBLICATIONS

Chan et al, "First-principles study of metal adatom adsorption on graphene", Physical Review B 77, 235430 2008 (Year: 2008).*
(Continued)

*Primary Examiner* — Krishnan S Menon
(74) *Attorney, Agent, or Firm* — Kilpatrick Townsend & Stockton LLP

(57) ABSTRACT

Methods herein disclosed include methods of producing a nanoporous membrane by coating a planar substrate (204) with a solution (solution tank 201) containing a reactive metal adatom. The coated planar substrate can then be perforated by initiating a redox reaction between the reactive metal adatom and the planar substrate that causes the reactive metal adatom to remove material, forming nanoscale pores in the planar substrate that result in a nanoporous planar material. This nanoporous planar material can be formed into a nanoporous membrane.

9 Claims, 3 Drawing Sheets

(51) Int. Cl.
*B01D 71/02* (2006.01)
*C02F 1/44* (2023.01)
*C02F 103/08* (2006.01)

(56) References Cited

U.S. PATENT DOCUMENTS

| | | | |
|---|---|---|---|
| 2017/0065939 A1 | 3/2017 | Kim et al. | |
| 2018/0147542 A1 | 5/2018 | Jhon et al. | |
| 2018/0290108 A1 | 10/2018 | Fanchini et al. | |
| 2019/0275470 A1* | 9/2019 | Biegelsen | B01D 67/0039 |

FOREIGN PATENT DOCUMENTS

| | | |
|---|---|---|
| WO | 2015124716 | 8/2015 |
| WO | 2016011124 | 1/2016 |
| WO | 2018119280 | 6/2018 |

OTHER PUBLICATIONS

Cao et al, "Metal etching method for preparing porous graphene as high performance anode material for lithium-ion batteries," Carbon 89 (2015) 41-46 (Year: 2015).*

Application No. EP20782251.1, Extended European Search Report, Mailed On Apr. 20, 2023, 7 pages.

Application No. PCT/IB2020/052760, International Search Report and Written Opinion, Mailed On Jun. 4, 2020, 9 pages.

* cited by examiner

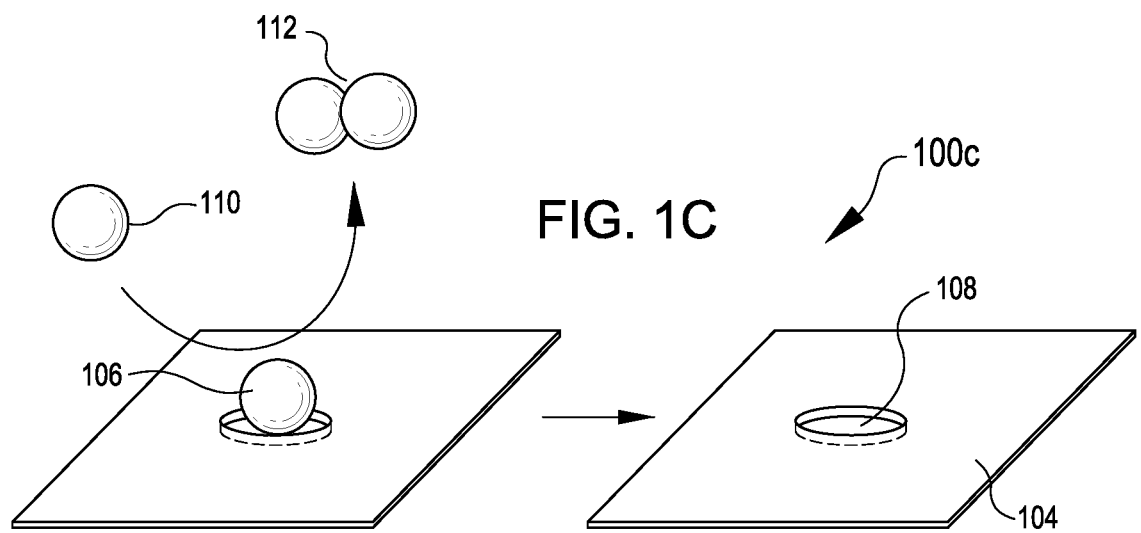
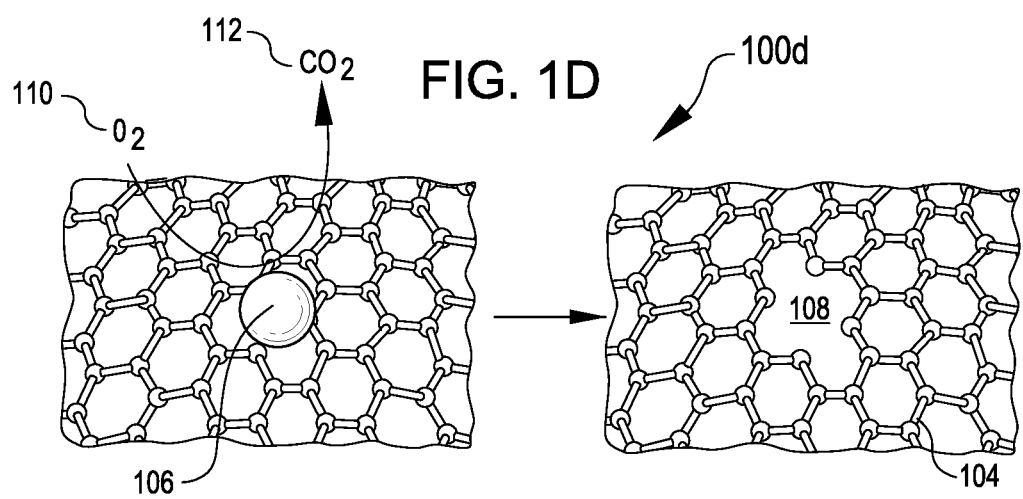

CONTROLLED NANOSCALE-PERFORATED TWO DIMENSIONAL MATERIALS AND MEMBRANES

BACKGROUND

Nanoporous two-dimensional (2D) materials have been used in recent years to achieve advances across a variety of technological areas including, e.g. membrane technology, electronics, energy storage and generation, DNA sequencing, and others. In one example, perforated nanoporous 2D membranes are becoming a family of high-performance separation membranes. The unique atomic thickness of 2D materials stimulates the continuous pursuit of ultrathin and selective membranes for separation.

Recent breakthroughs in exfoliation and perforation of monolayers promoted the throughput and accuracy of nanosheet membranes for molecular separation. Although they were initiated from graphene and graphene oxide (GO), laminar membranes have been explored in several other graphene-family 2D atomic crystals and layered oxides. Their fabrication approaches have been well-established and the precise manipulation of inter layer spacing for efficient separation is of great importance. The membranes with well-defined transport channels and ultrathin thickness have demonstrated extraordinary performance for water and gas separations. However, the graphene and GO membranes are facing the following challenges.

For the graphene sheets, some of the challenges include high cost associated with the monolayer graphene production, the generation of nanopores at high density and uniformity of size and chemical functionalities on the membrane, and the intrinsic and extrinsic defects formed during growth and graphene transfer processes. For GO membranes, some of the challenges include hydration-induced swelling of the GO nanosheet spacing, water instability of GO membranes, low mechanical stability, and lack of scalable liquid film processing techniques to manufacture large-area membranes. These challenges are believed to be common to all graphene, GO, and comparable membranes. Thus, improved techniques are needed for producing bulk monolayers, for producing regular nanopores and sub-nanopores at high density with regularity, with scaling nanoporous membranes into commercially usable separation devices, and applying such membranes in practical separation devices.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, methods of producing a nanoporous membrane are disclosed that include coating a planar substrate with a solution containing a plurality of reactive metal adatom to form a coated planar substrate. The coated planar substrate can be subjected to a redox reaction between the reactive metal adatom and the planar substrate that causes the reactive metal adatom to form nanoscale pores in the planar substrate to form a nanoporous planar material. The nanoporous planar material can then be formed into the nanoporous membrane. According to various embodiments, suitable planar substrates can include, but are not limited to: graphene, graphene oxide, or molybdenum disulfide. Initiating the redox reaction can include exposing the coated planar substrate to an energy source such as, but not limited to, laser, heat, or microwave radiation. Forming the membrane from the nanoporous planar material(s) can include uniformly depositing a solution containing the nanoporous planar material, e.g. in the form of suspended flakes, onto a sheet of filter paper. The distributed solution can be compressed and dried, e.g. in a continuous roller process, into the nanoporous membrane, which can then be cleaved from the filter paper.

BRIEF DESCRIPTION OF THE DRAWINGS

FIGS. 1A-1D illustrate a perforation mechanism utilizing metal adatom to react with a planar substrate, in which FIGS. 1A and 1B illustrate bonding a metal adatom with the planar substrate to displace atoms in the planar substrate, and FIGS. 1C and 1D illustrate subsequent removal of the reactive metal adatom from the planar substrate to form nanoscale pores.

DETAILED DESCRIPTION

Figure 1A:
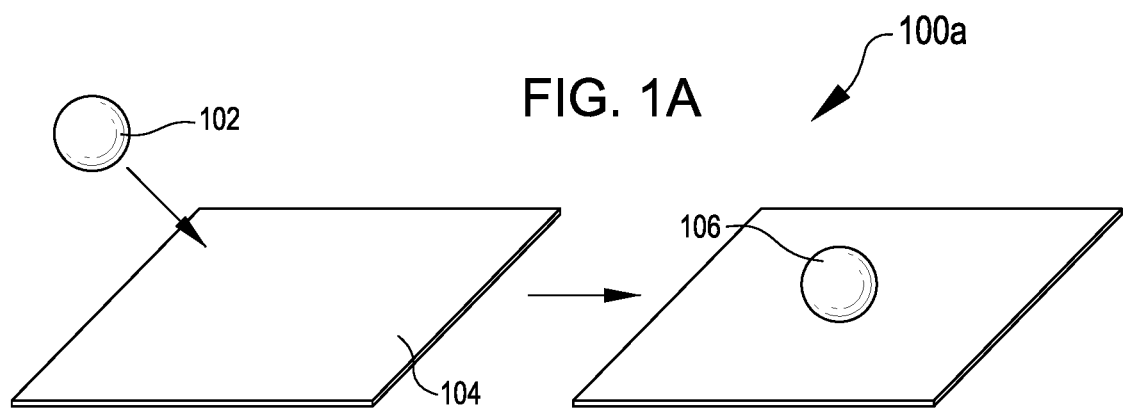

The present disclosure discloses a method to perforate 2D materials sheet with controlled pore size and density. Further, it presents an integrated approach to produce membrane at industrial scale. A variety of 2D materials formed according to various approaches can be used as a substrate for forming perforated sheets, in accordance with various embodiments of the present disclosure.

Perforating the 2D Materials:

According to various embodiments, a 2D material with nanoscale perforations can be formed from a basal plane of 2D materials such as, but not limited to, graphene, graphene oxide, or molybdenum disulfide. First, the 2D material is formed, generally without nanoscale perforations, into a basal plane. Redox adatom of elements other than those forming the 2D material are then coated onto the basal plane of 2D materials. The redox adatom coating can be achieved by any suitable deposition technique, e.g., atomic layer deposition, physical vapor deposition, chemical deposition, etc. Exposure of the combined coated plane to an energy source (e.g., laser, heat, microwave, etc.) with controlled parameters (e.g., time, power, ambient gas or radiation source, etc.) causes the initiation of a redox reaction. For example, according to some embodiments, a metal-carbon, metal-sulfur oxidation-reduction reaction allows the knocking/oxidizing of carbon atoms from a graphene basal plane, leaving behind nanoscale pores in the basal plane. According to some other embodiments, the metal-carbon, metal-sulfur oxidation-reduction reaction can allow knocking/ oxidizing of sulfur atoms from an $MoS_2$ basal plane leaving behind nanoscale pores in the basal plane.

When two different materials are coupled together, the one with lower reduction potential has excess electron activity, where the electrons are transferred to the material with the more positive reduction potential. The reduction reaction and chemical process can be explained by the Nerest equation. Two solutions can be obtained using this equation. One is:

$$\Delta G = \Delta G_{C \rightarrow CO_2} - nF\Delta E^0, \quad (1)$$

where $\Delta G_{C \rightarrow CO_2}$ is the Gibbs free energy for the carbon pyrolysis, n is the number of electrons in the reaction, F is the Faraday's constant, and $\Delta E^0$ is the difference in the standard reduction potentials of between the metal and carbon $\Delta E^0 = \Delta E_M^0 - \Delta E_C^0$. In the case of the noble-metal carbon system, $\Delta E^0$ has a positive value and the free energy of the reaction ($\Delta G$) is lower than that of the isolated carbon system. This suggests that a metal contact, which has a high reduction potential, can promote the oxidation of graphitic carbon in graphene.

The Other Solution is:

$$d\Delta G = -\Delta S_{C \rightarrow CO_2} - dT - nFd\Delta E^0, \quad (2)$$

where $\Delta S_{C \rightarrow CO_2}$, is the entropy of the reaction and T is the absolute temperature. At equilibrium, $d\Delta G$ approaches zero, and the equilibrium temperature can be affected by the difference in reduction potential. Consequently, pyrolysis or oxidation can be induced more easily with increasing difference in reduction potential and temperature.

According to various embodiments, nanoscale perforations can be formed in a graphitic carbon 2D material according to the following methods, using reactions between reactive metal adatom and a sheet of the graphitic carbon 2D material. The reactions between the metal (M) and the graphitic carbon (C) can be written as follows:

$$aM + bO_2 \rightarrow kM_xO_y : \Delta G_1 \quad (3)$$

$$kM_xO_y + bC \rightarrow aM + bCO_2 : \Delta G_2 \quad (4)$$

. . . resulting in the overall chemical reaction:

$$aM + bC + bO_2 \rightarrow aM + bCO_2 \quad (5)$$

Metal adatom, when placed in contact with the graphitic carbon sheet in the presence of an energy source, adsorb energy and thermally agitate to react with the adjacent carbon atoms (FIGS. 1A-1D). The perforation mechanism for $MoS_2$ and other 2D materials will be similar, if based on a slightly different redox reaction. The controlled parameters can be varied to form the different size and density of nano-pores in the 2D materials. The perforation process can be conducted in solution using, e.g., small flakes of the 2D material, in order to form perforated flakes of the 2D material. The perforated flakes can then be washed with an acidic solution and water to remove the residual metals and obtain metal-free perforated 2D material. Perforated flakes formed by these methods can be used alone as ultrathin membrane material, or can be combined (e.g., layered) with filtration material to form larger membranes or filters.

Figure 1B:
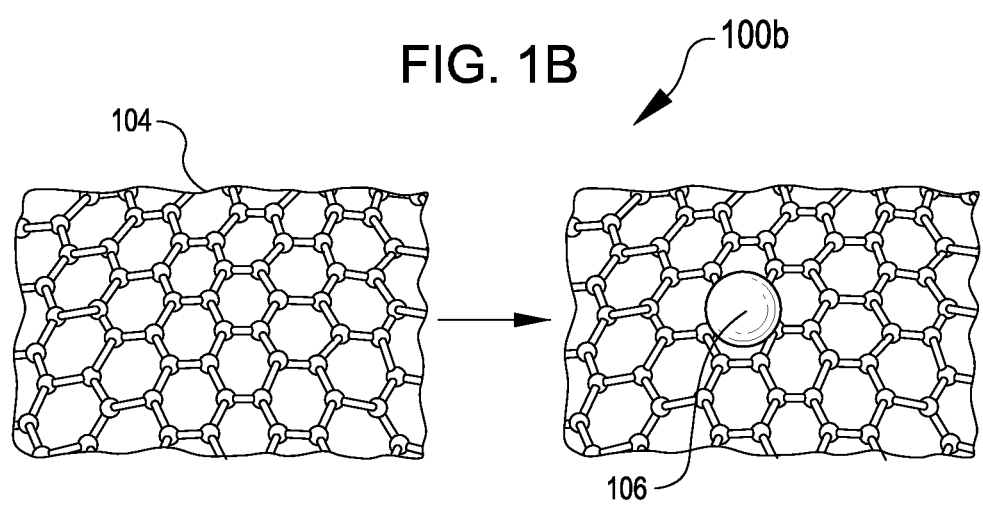

As shown in FIGS. 1A-1D, an example of a perforation process 100, according to various embodiments, includes the deposition of redox adatom 102 onto the 2D material 104. This process is shown diagrammatically in FIG. 1A, in which a redox adatom 102 is bonded with (i.e., adsorbed into) a sheet of the 2D material 104, forming a modified sheet of 2D material containing the adatom as an inclusion 106. FIG. 1B illustrates a similar process 100b to illustrate the bonding of the redox adatom with a planar graphene substrate in particular, where the redox adatom bonds with carbon atoms in the graphene substrate, although it will be understood that the bonding step may look different depending on the specific 2D material. FIG. 1C illustrates a second process step 100c at which the initiation of the redox reaction perforates the 2D material, removing the metal adatom from the inclusion 106 while facilitating the redox reaction of the adjacent carbon atoms with free oxygen to form carbon dioxide, and leaving behind the sheet of 2D material 104 with a nanoscale void 108. FIG. D illustrates the process step 100d whereby adatom removal perforates the planar graphene substrate of FIG. 1B. The similar reaction occurs with, for example, a planar sheet of GO. In the case where the 2D material is a planar sheet of $MoS_2$, the metal adatom facilitates the redox reaction between oxygen and the sulfur atoms in the basal plane. Suitable metal adatom for facilitating the metal-carbon or metal-sulfur oxidation-reduction reactions can include, but are not limited to, at least the metals of the transition element group of periodic table, for example: cobalt, iron, nickel, gold, silver, platinum, titanium etc.

Modifiers to Perforated 2D Materials:

Perforated 2D materials can be modified by mixing suspended perforated 2D materials (e.g., perforated flakes of 2D materials) with a modifier such as, but not limited to, ionic liquids, a thermoset polymer, a thermoplastic polymer etc., in a controlled weigh ratio. The controlled weight ratio can vary widely (e.g. from negligible or 0% modifier to up to 99.99% modifier) by means of different mediator (i.e. solid, liquid, gases or by combination of all etc.) to obtain a modified basal plane, i.e., a nanoporous 2D material. The modified perforated 2D materials can be used to fabricate nanoporous membranes or filters by combining the modified perforated 2D material with an existing membrane or other suitable substrate for strength and structure.

Membrane Production Using Wet-Filtration Zipping Technique:

According to various embodiments, a nanoporous membrane can be formed by a wet-filtration zipping technique using modified, perforated 2D material in conjunction with a substrate such as, but not limited to, a sheet of filter paper or another membrane. According to one example, the modified perforated 2D material will be dispersed in a solution. The solution may be polar or non-polar, depending on the specific 2D material used. The final nanoporous membrane can then be formed by a deposition and wet-filtration zipping technique using the modified perforated 2D material on the substrate to form a continuous membrane.

Figure 2:
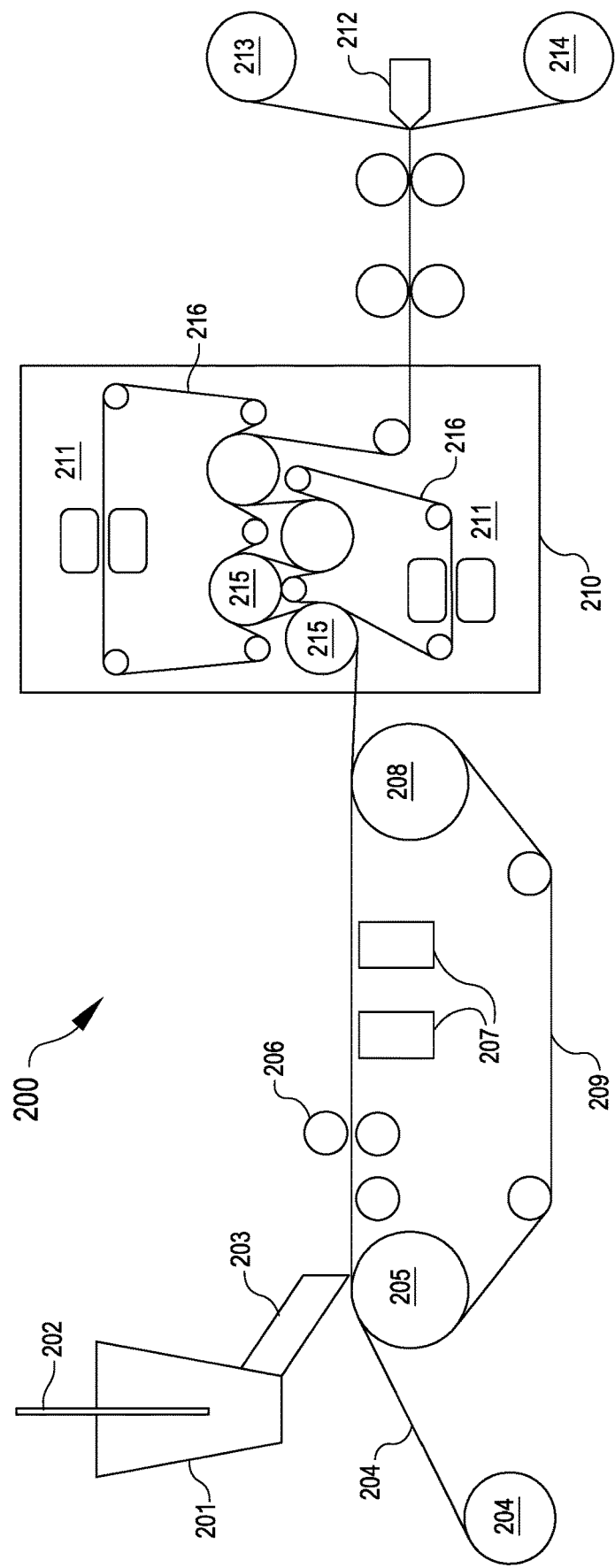
FIG. 2 is a diagrammatic view of a continuous process for production of a nanoporous membrane.

Referring to FIG. 2, the solution of modified perforated 2D material will be stirred (with the help of i.e. tip sonication, stirrer, mixer blades etc.) in the tank continuously to maintain the well dispersion of the 2D sheets in solution. The solution will be fed to and spread over the filter paper which is rolling over the mesh. The suction helps to drain the solution and allows a uniform sediment of 2D sheets onto a filter paper. The drained sediment is fed to the drying unit with heater, where sediment is zipped and compressed into the membrane. The membrane and filter paper are separated by a cleavage unit and collected separately on to the rolling wheel.

FIG. 2 illustrates a continuous production process 200 of perforated 2D materials membrane via a wet-filtration-zipping method. Modifier-treated perforated 2D materials are dispersed in a solution tank 201 using mixer/tip sonication rod 202. The dispersed slurry is channeled through a spreader 203 and deposited in a thin layer over a continuously fed filter paper substrate 204 that is pulled by a rolling assembly 209 and passed over a mesh 207. Suction is applied to the filter paper 204 containing the deposited nanoporous slurry as it passes over the mesh 207 to drain water and produce a uniform sediment of the nanoporous 2D material onto the filter paper. The rollers 205, 206, and 208 of the rolling assembly 209 maintain continuous motion of the filter paper 204 over the mesh 207. The filter paper 204 containing the uniform sediment is then fed through a drying unit 210, which contains heaters 211 and a set of compression rollers 215. The filter paper 204 is passed through the set of compression rollers 215 along a set of supportive belts 216 that operate in tension to further zip and compress the uniform sediment into the filter paper 204 to form a nanoporous membrane along the filter paper. After leaving the drying unit 210, the membrane and filter paper are separated by a cleavage unit 212 and collected separately on to the rolling wheels 213, and 214, respectively. According to some alternative embodiments, the membrane can be retained with the filter paper, or with any other suitable porous substrate, in order to provide additional strength or structural support to the membrane. According to further alternative embodiments, the membrane can be applied to any suitable porous substrate for increasing strength or structural support of the membrane.

The techniques and systems described herein overcome several problems in existing systems. For example, various methods that were previously proposed for perforating 2D materials included, e.g., the use of intrinsic defects obtained during growth of 2D materials, the use of Ga beam deposition using a focused ion beam, the use of polymeric material for the growth of graphene, the growth of zeolites with porous structures, the use of MOF with porous structures, and the use of MXene with a porous structure. However, none of the above methods are applicable at an industrial scale for producing large, continuous membranes at low cost.

Membranes with Perforated 2D Materials:

Nanoporous membranes as described herein can be used for a variety of useful applications, such as filtration and reverse osmoses (RO). Owing to their unique atomic thickness, 2D materials have been explored increasingly as a fundamental platform to develop separation technologies. For example, perforated 2D materials with atomic thickness can be used as ultimate membranes for separation. Membrane pores are provided either by an intrinsic porous structure such as in zeolites and MOFs, or by drilled pores such as in graphene like 2D materials. They can be regarded as building blocks of advanced desalination membranes with two main structures, e.g. monolayer and stacked multilayer structures. However, previously developed nanoporous membranes were limited in size by the fabrication techniques available, typically to at-most micrometer lateral dimensions.

According to some embodiments, a graphene membrane with sub-nanometer pores can act as a reverse-osmoses (RO) membrane. In this process, salt water, subjected to a high pressure and in contact with a nanoporous membrane, is divided into two parts: water molecules passing through the membrane and salt ions that are blocked. Owing to the formation of a dense and delocalized electron cloud from the π-orbitals of graphene, which blocks the voids within its aromatic rings, pristine graphene is impermeable. Thus, even He (as the smallest monoatomic molecule with a molecular radius of 1.3 Å) cannot pass through it. However, according to simulations, by the inclusion of pores of controlled size, density and functionality, graphene membranes can surpass current desalination membranes, showing orders of magnitude higher permeability and selectivity.

Molecular dynamics simulations have predicted that nanoporous graphene, due to its extraordinary water flow rate (up to 400 L cm$^{-2}$ day$^{-1}$ MPa$^{-1}$) and high (up to 100%) salt rejection (depending on the pore size and chemistry), may be one of the most desirable materials for water desalination. The cause of the ultrahigh water permeability of graphene, which translates into a notable reduction in the initial capital investment and operating costs of desalination plants, is its atomic thickness. Thus, the creation of controlled pores in terms of size, density and functionality in a graphene structure promises the development of a highly selective and, at the same time, permeable membrane for water desalination. In some specific embodiments, the nanoporous membranes as described herein, when used for salt water filtration in the presence of pressurized salt water at a pressure ranging from 0.1 MPa to 6 MPa, allow a water flow rate through the membrane ranging from about 100 to 400 L cm$^{-2}$ day$^{-1}$ MPa$^{-1}$ with 90 to 100% salt rejection.

Despite the significant advantages of monolayer graphene membranes, especially in terms of water permeability, the fabrication of leak-free, large-area monolayer membranes, (e.g., graphene membranes, graphene oxide membranes, molybdenum disulfide membranes, or a combination of two or more of the above,) with controlled pore density and size on the industrial scale is challenging. One solution is the fabrication of desalination membranes based on stacked graphene, GO, or MoS$_2$ nanosheets. These nanosheets are highly stackable, mainly due to their structure, a single-atom-thick layer with a lateral dimension reaching tens of micrometers. Durable interlayer hydrogen bonds hold the nanosheets together to form a nanoporous membrane for potential use as an advanced ionic or molecular sieving membrane, e.g. for RO, for desalinization, for water purification, or other suitable applications.

Other variations are within the spirit of the present invention. Thus, while the invention is susceptible to various modifications and alternative constructions, certain illustrated embodiments thereof are shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context Of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of producing a nanoporous membrane, the method comprising:
    coating a planar substrate with reactive metal adatoms to form a coated planar substrate in which the reactive metal adatoms are in contact with the planar substrate;
    accomplishing an oxidation-reduction (REDOX) reaction between the reactive metal adatoms and the planar substrate in the coated planar substrate that causes the reactive metal adatoms to form nanoscale pores in the planar substrate to form a nanoporous planar material; and
    forming the nanoporous planar material into a nanoporous membrane, wherein forming the nanoporous membrane comprises:
    depositing flakes of the nanoporous planar material onto a porous substrate;
    compressing the flakes of the nanoporous planar material and the porous substrate, wherein compressing the flakes of the nanoporous planar material and the porous substrate comprises feeding the flakes of the nanoporous planar material and the porous substrate through compression rollers; and
    cleaving the nanoporous membrane from the porous substrate.

2. The method of claim 1, wherein the planar substrate comprises a two-dimensional (2D) material comprising at least one of graphene, graphene oxide (GO), or molybdenum disulfide ($MoS_2$).

3. The method of claim 1, wherein the reactive metal adatoms comprise a metal selected from one of: cobalt, iron, nickel, gold, silver, platinum, and titanium.

4. The method of claim 1, wherein accomplishing the REDOX reaction comprises operating an energy source to apply an energy to the coated planar substrate.

5. The method of claim 1, wherein:
    the planar substrate comprises a 2D graphene matrix; and
    the nanoscale pores comprise voids in the 2D graphene matrix formed by removal of pairs of adjacent carbon atoms.

6. The method of claim 1, further comprising layering the nanoporous membrane on a supportive substrate.

7. The method of claim 1, wherein compressing the flakes of the nanoporous planar material and the porous substrate is performed in the presence of heat such that the flakes are dried and compressed.

8. The method of claim 1, wherein the nanoporous planar material comprises flakes of the planar substrate with the nanoscale pores.

9. The method of claim 8, wherein the nanoporous membrane comprises a compressed stack of the flakes of the nanoporous planar material.

* * * * *